(12) United States Patent
Nath et al.

(10) Patent No.: US 7,555,412 B2
(45) Date of Patent: Jun. 30, 2009

(54) COMMUNICATION EFFICIENT SPATIAL SEARCH IN A SENSOR DATA WEB PORTAL

(75) Inventors: Suman K. Nath, Redmond, WA (US); Yanif Ahmad, Providence, RI (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 11/673,448

(22) Filed: Feb. 9, 2007

(65) Prior Publication Data

US 2008/0195584 A1 Aug. 14, 2008

(51) Int. Cl.
*G06F 11/00* (2006.01)
*G21C 17/00* (2006.01)

(52) U.S. Cl. .............. 702/188; 702/122; 702/123; 702/182; 345/589

(58) Field of Classification Search ......... 702/181–189, 702/92–95, 104, 150–153, 119–123; 345/589; 707/3
See application file for complete search history.

(56) References Cited

U.S. PATENT DOCUMENTS

| 6,084,595 | A | 7/2000 | Bach et al. |
| 6,694,311 | B1 | 2/2004 | Smith |
| 6,732,088 | B1 | 5/2004 | Glance |
| 7,080,065 | B1 | 7/2006 | Kothuri et al. |
| 2004/0193615 | A1 | 9/2004 | Kothuri |
| 2005/0015216 | A1 | 1/2005 | V. Kothuri |
| 2005/0165749 | A1* | 7/2005 | Mazzagatti et al. ............ 707/3 |
| 2006/0161645 | A1 | 7/2006 | Moriwaki et al. |
| 2006/0256210 | A1 | 11/2006 | Ryall et al. |

OTHER PUBLICATIONS

Ganesan et al., "Multiresolution Storage and Search in Sensor Networks", ACM Transactions on Storage, vol. 1, No. 3, Aug. 2005, ACM 2005, pp. 277-315.*

Ganesan, et al., "Dimensions: Why do we need a new Data Handling Architecture for Sensor Networks?", retrieved at <<http//delivery.acm.org/10.1145/780000/774786/p143-ganesan.pdf?key1=774786&key2=6919524611&coll=GUIDE&dI=GUIDE&CFID=75919783&CfTOKEN=92791909>>, ACM SIGCOMM Computer Communications Review, vol. 33, No. 1, Jan. 2003, pp. 143-148.

(Continued)

*Primary Examiner*—Hal D Wachsman
*Assistant Examiner*—Phuong Huynh
(74) *Attorney, Agent, or Firm*—Lee & Hayes, PLLC

(57) ABSTRACT

Techniques for collecting and displaying sensor data captured by a spatially representative sample of sensors requested in a search query are described. The sensors are represented in an index structure (e.g., a data tree). In response to a query, the index structure is leveraged to identify a subset of sensors that exhibits a similar spatial distribution to the original full set of sensors. Sensor data is then collected from the subset of sensors by probing the sensors or retrieving recently cached data located by the index and returned to satisfy the query. In this manner, the number of sensors to be probed is reduced, thereby reducing latency involved with polling a large number of sensors and making the search process more efficient.

21 Claims, 8 Drawing Sheets

OTHER PUBLICATIONS

Ganesan, et al., "Multiresolution Storage and Search in Sensor Networks", retrieved at <<http://delivery.acm.org/10.1145/1090000/1084780/p277-ganesan.pdf?key1=1084780&key2=6078524611&coll=ACM&CFID=75919783&CFTOKEN=92791909>>, ACM Transactions on Storage, vol. 1, No. 3, Aug. 2005, ACM, 2005, pp. 277-315.

Greenstein, et al., "DIFS: A Distributed Index for Features in Sensor Networks", retrieved on Nov. 28, 2006 at <<http://scholar.google.com/scholar?hl=en&lr=&q=cache:ylBjfUKYcwUJ:dimlab.usc.deu/csci599/Fall2003/Sensor%2520Network/DIFS%2520A%2520Distributed%2520Index%2520for%2520Features%2520in%2520Sensor.pdf+>>, pp. 1.

Guttman, "R-Trees: A Dynamic Index Structure for Spatial Searching", retrieved at <<http://www.sai.msu.su/~megera/postgres/gist/papers/gutman-rtree.pdf>>, ACM, 1984, pp. 47-57.

Li, et al., "Multi-dimensional Range Queries in Sensor Networks", retrieved at <<http://citeseer.ist.psu.edu/cache/papers/cs2/179/http:zSzzSzenl.usc.eduzSzpaperszSz.zSzcachezSzp046-Ii.pdf/multi-dimensional-range-queries.pdf>>, SenSys'03, Nov. 5-7, 2003, ACM, 2003, pp. 13.

* cited by examiner

COMMUNICATION EFFICIENT SPATIAL SEARCH IN A SENSOR DATA WEB PORTAL

BACKGROUND

Over the past several years, there has been a proliferation of sensor network deployments into our environments. Sensors in such networks capture data pertaining to weather, traffic, parking, security, real-time views, and many other data items and conditions.

The sensor data portal model has been designed to expose the data for search and querying by a general audience. Sensor data web portals enable browsing of disparate collections of sensor networks. Such portals function as a rendezvous point for sensor network administrators to publish their data, and through which a large base of users may pose individual queries to the sensor network. Thus, the sensor data web portal provides a platform with which users can interact and visualize content being generated by autonomous sensor networks.

However, sensor data web portals commonly experience time delays due to the continuously changing nature of sensor readings and unavailability of data. Therefore, there remains a need to improve the way sensor data is collected and presented to users via a web portal.

SUMMARY

This summary is provided to introduce simplified concepts relating to spatial searches, and these concepts are further described below in the detailed description. This summary is not intended to identify essential features of the claimed subject matter, nor is it intended for use in determining the scope of the claimed subject matter.

Techniques for collecting and displaying sensor data captured by a spatially representative sample of sensors requested in a search query are described. The sensors are represented in an index structure (e.g., a data tree). In response to the search query, the index structure is leveraged to identify a subset of sensors that exhibits a similar spatial distribution to the original full set of sensors. Sensor data is then collected from the subset of sensors by probing the sensors, or retrieving recently cached data located by the index, and finally returned to satisfy the query. In this manner, the number of sensors to be probed is reduced, thereby reducing latency involved with polling a large number of sensors and making the search process more efficient.

BRIEF DESCRIPTION OF THE DRAWINGS

The detailed description is described with reference to the accompanying figures. In the figures, the left most digit(s) of a reference number identifies the figure in which the reference number first appears. The same numbers are used throughout the drawings to reference like features and components.

DETAILED DESCRIPTION

Figure 1:
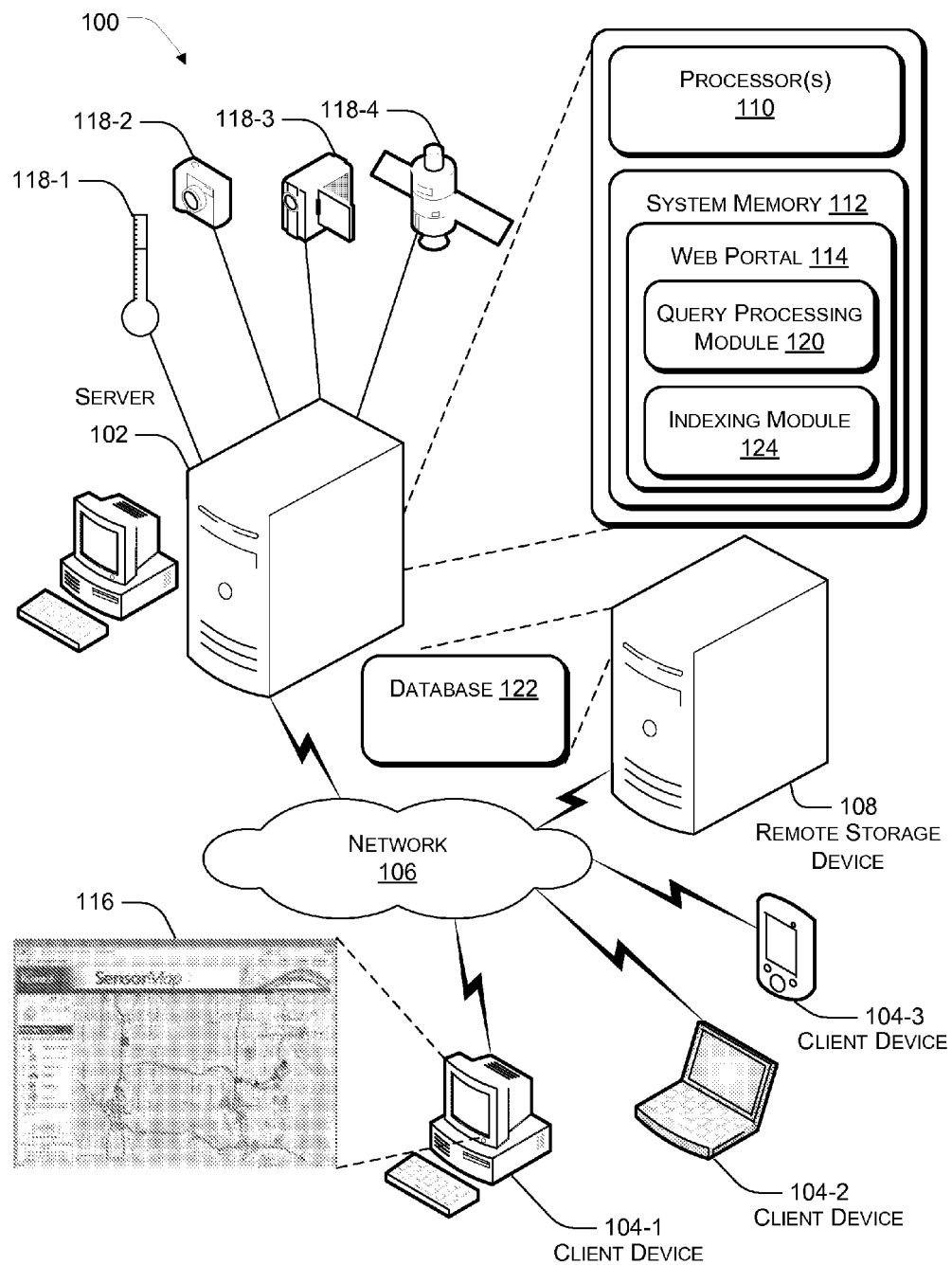
FIG. 1 illustrates an exemplary architecture in which one or more client devices can access a server over a network to conduct a spatial search for sensor data using a web portal.

This disclosure is directed to techniques for conducting a spatial search for sensor data using a sensor data web portal. The portal provides users with continuous access to sensor readings obtained from various sensors spread throughout disparate sensor networks. Users specify certain spatial regions from which they wish to receive readings, and a summarization of the sensor readings satisfying these conditions is produced and returned, rather than values from individual sensors. The summarization may be performed in many ways, including by simple aggregates such as an average value over groups of sensors in the query region, a maximum value, a minimum value, or sum of the values.

Generally, query processing in the sensor portal involves two high-level components: (1) a portal web service to facilitate query processing and (2) a backend database to maintain sensor metadata and provide core search functionality. In this architecture, data is not maintained in any persistent archive, but is instead collected in an on-demand fashion during query processing. First, a portal service translates any queries issued by clients into a sequence of declarative queries. The first query asks the backend database to determine a set of relevant sensors. The database processes the queries by inspecting the sensor locations it maintains. Upon receipt of a list of sensors, the web service first checks a cache to ascertain whether there is any recent and current sensor data that can be returned to satisfy the query. If fresh data in the cache is not sufficient to answer the query, the web service polls the sensors for updated readings and issues a second query to the database to insert the new readings into the cache maintained in the backend. The web service then queries the database for all relevant readings from its cache, presenting the results to the user. Moreover, the backend database may routinely poll sensors as data in the caches become stale. This polling may occur responsive to a search query or as part of a separate process. The polling is thus conducted in a manner transparent to the user, as the user merely submits a query and receives results from the web portal.

One challenge for the data portal is to provide timely processing of user queries using a data collection mechanism that efficiently retrieves readings from the sensor networks, with large numbers of sensors and large volumes of queries present in the system. The techniques described herein address this challenge by providing a layered sampling algorithm that facilitates probing of random subsets from the complete list of sensors relevant to a query. Layered sampling leverages the index structure to produce a random subset of sensors that exhibits a similar spatial distribution to the original full set of sensors. By reducing the number of sensors to probe, the latency involved with polling a large number of sensors is reduced, thereby making the process more efficient.

The techniques described herein may be used in many different operating environments and systems. Multiple and varied implementations are described below. An exemplary environment that is suitable for practicing various implementations is discussed in the following section.

Exemplary systems and methodologies for obtaining the sensor data from various sensors through the sensor data web portal are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing contexts, acts and operations described hereinafter is implemented in hardware or other forms of computing platforms.

Exemplary Environment

FIG. 1 illustrates an exemplary architecture 100 in which a communication efficient spatial search sensor data web portal may be implemented. Architecture 100 is shown in a client-server environment where a server 102 receives queries from any number of client devices 104-1, 104-2, and 104-3 (collectively referred to as devices 104) over a network 106. The queries contain requests for sensor data from sensors in distributed sensor networks. Server 102 processes the queries by employing a sensor index maintained locally or on a remote storage 108 that is accessible over network 106. After processing, server 102 returns results to the client devices 104.

Server 102 may be implemented in many ways including, for example, as a standalone general purpose computing device or mainframe, or as a cluster of servers (e.g., arranged in a server farm). Client devices 104 may be implemented in any number of ways including, for example, as general purpose computing devices, laptops, mobile computing devices, PDAs, communication devices, GPS-equipped devices, and/or so on. Network 106 may include, but is not limited to, a Local Area Network (LAN), a Wide Area Network (WAN), and a Metropolitan Area Network (MAN). Further, network 106 is representative of a wireless network, a wired network, or a combination thereof. Storage 108 may be implemented in any number of ways, including as a remote database server or as an accessible networked storage device, such as a RAID system or the like.

Server 102 includes one or more processor(s) 110 coupled to a system memory 112. Processor(s) 110 may include, for example, microprocessors, microcomputers, microcontrollers, multi-core processors, and so forth. The processor(s) 110 are configured to fetch and execute computer-program instructions stored in system memory 112. System memory 112 includes computer-readable media in the form of volatile memory, such as Random Access Memory (RAM) and/or non-volatile memory, such as Read Only Memory (ROM) or flash RAM.

Server 102 hosts a web portal 114 that facilitates user access to sensor data obtained from the various sensors. The web portal 114 provides a user interface (UI) that may be rendered on client devices 104 to support submission of user queries for sensor data and presentation of results. One example UI 116 is illustrated as a browser-rendered graphical UI titled "SensorMap" on client device 104-1. UI 116 allows users to specify spatial regions to identify a collection of sensors from which they wish to receive readings. The sensors may be of any type including, for example, temperature sensors, video cameras, humidity sensors, wind sensors, traffic sensors, parking sensors, security sensors, and so on. In FIG. 1, representative sensors include a temperature sensor 118-1, a camera 118-2, a video camera 118-3, and any other sensors 118-4 (collectively referred to as sensors 118).

Upon receiving a query submitted by a client device 104, server 102 analyzes and translates the query into a sequence of declarative queries that may be used to identify a set of sensors that can contribute to the sensor data requested by the user. Server 102 implements a query processing module 120, which is stored in system memory 112 and executed by processor(s) 110. To aid in identifying the appropriate set of sensors to respond to the user's query, query processing module 120 discovers attributes of the set of sensors. The attributes may include, for example, sensor location in terms of latitude and longitude, type of sensor, schemas for sensor readings, and so on.

In one implementation, query processing module 120 ascertains sensor attributes from a database 122, which is illustrated as being stored in remote storage device 108 (although it may be stored in other locations, such as within system memory 112). Database 122 stores an index of the sensors, and the index maintains metadata describing the attributes of the sensors. Server 102 has an indexing module 124 stored in system memory 112 and executable on processor(s) 110 to create such index structures. In one implementation, the index is structured as a data tree having plural nodes arranged in layers. More particularly, the tree may be configured as a Collection R-Tree (or "COLR-Tree"), which is a spatial index built according to the techniques described herein, but loosely based on a classic R-Tree structure. One example technique of creating a COLR-Tree structure is described below in more detail with reference to FIGS. 3 and 4.

Once the set of sensors are identified, the appropriate sensors are polled and updated readings are inserted into the database. Caches may be maintained within the indexing tree to hold the data. The collected updated readings may then be retrieved from the database and presented to client devices 104 using the UI 116.

To illustrate this architecture 100, consider the following example. Suppose a user at client device 104-1 wants to know the temperature at a specific geographic location. The user submits a query for the temperature at the target location using UI 116 rendered on client device 104-1. Server 102 receives the query and query processing module 120 examines the query to determine the latitude and longitude of the target location. Subsequent to examination, query processing module 120 reviews the data tree stored in database 122 to identify a set of sensors having latitudes and longitudes within the target location. Upon identifying the set of sensors from various sensor networks, query processing module 120 probes the set of sensors to obtain updated sensor readings, including temperature data. The updated sensor data is then formatted and presented to the user through UI 116.

Although the sensors 118 are shown accessible by server 102, the sensors 118 may be accessible directly by remote storage device 108. This allows the sensor metadata to be stored directly in database 122 in response to probing the sensors by indexing module 124. The sensor metadata stored in remote storage device 108 is then indexed to form the data tree.

Figure 2:
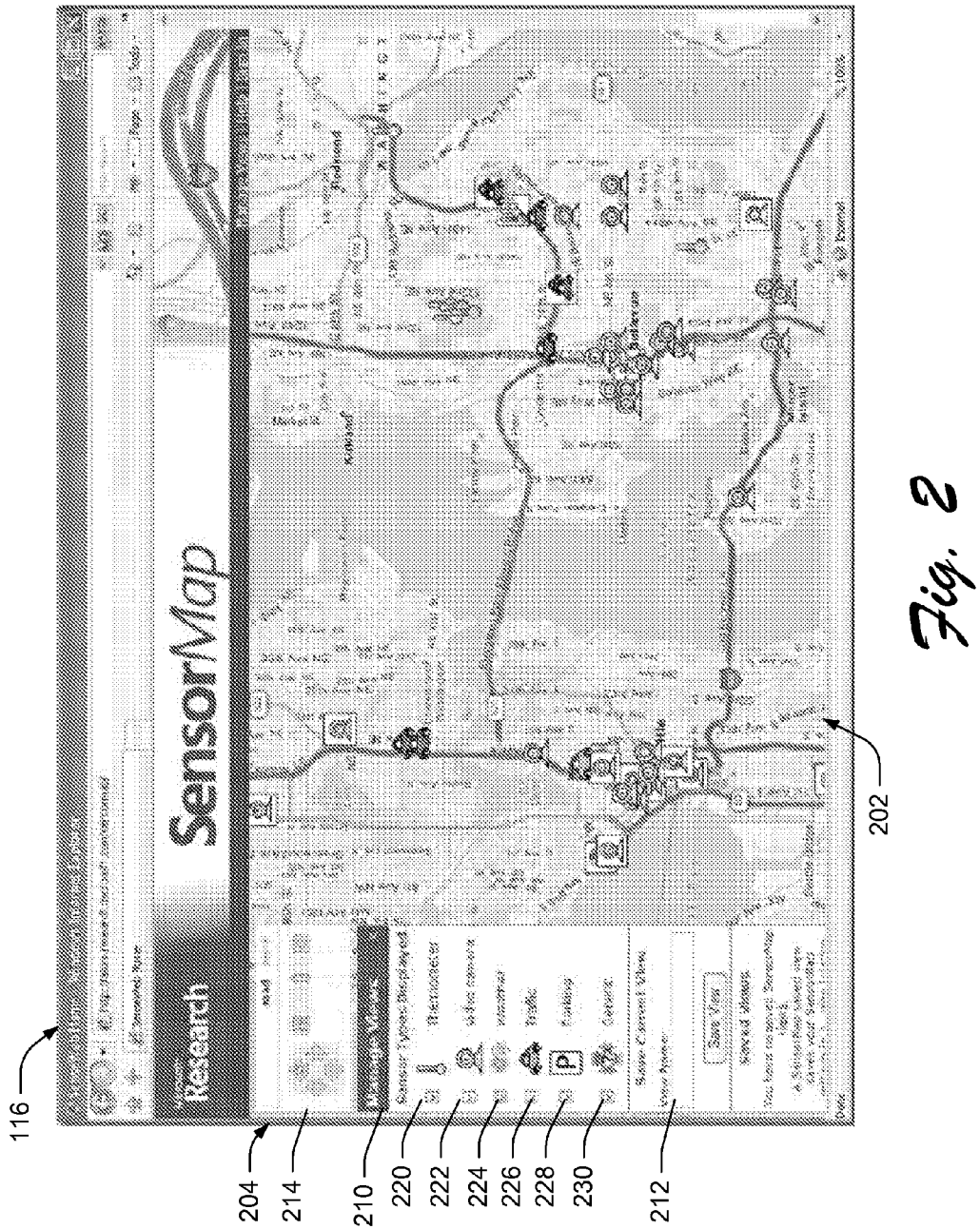
FIG. 2 illustrates an exemplary spatial sensor search user interface (UI) that facilitates submission of search queries and presents results of sensor data collected from various sensors in various locations according to the queries.

FIG. 2 illustrates the sensor search user interface (UI) 116 in more detail. In this example, search UI 116 is configured in the environment of depicting geographic locations of sensors within a certain region. Although not illustrated in this rendering, the UI 116 allows the user to draw arbitrary polygons to specify a search region. Thus, the user can form a box or rectangle, for example, around a portion of the map displayed in UI 116 to designate an area of interest. Alternatively, the user may specify a search region by entering search keywords (e.g., "Seattle", "King County") or by entering phrases or sentences (e.g., "weather in Seattle", or "What is the traffic on I-90 and I5 interchange?"). Once the user submits the query, server 102 collects the appropriate data and returns it to UI 116 for depiction in a results pane 202. In this illustration, a regional map of the cities of Seattle and Bellevue in Washington State is shown in results pane 202, as well as various freeways and highways within this region. It should be noted that the sensor search UI 116 may be implemented in other environments, and display results of searches in other formats, including non-graphical and non-geographical presentations.

Next to the results pane 202 in search UI 116 is a control panel 204 that enables a user to refine the search or navigate throughout the results. In the illustrated implementation, control panel 204 has a sensor selection area 210, a view name entry area 212, and location viewing controls 214. Sensor selection area 210 provides various options that allow a user to define which sensor types to display in results pane 202, since there may be many types of sensors located throughout a region. Representative sensors shown in sensor selection area 210 include options for temperature sensors 220, video or web cameras 222, weather sensors 224, traffic sensors 226, parking sensors 228, and other generic sensors 230. Here, the user may check a corresponding box to have the sensor type displayed. The sensor types selected by the user are then represented by graphical icons on the map in results pane 202.

View name entry area 212 enables the user to name the search results view. Upon entry of the name, the user may actuate a control (e.g., "Save View" button or return key) to save that name. Once a particular search is named, the user may quickly rerun future searches for the same sensor data by simply selecting the view name. This is useful, for example, for the user who might like to know traffic conditions on a daily basis for the morning or evening commutes.

Location viewing controls 214 facilitates user navigation through various locations within the region in results pane 202. Viewing controls 214 also provide additional control features (i.e. panning and zooming) to view sensors in each of the locations. Thus, the user may be provided with a facility to identify sensor densities (i.e. number of sensors) and types of sensors at different locations, thereby enabling the user to make a decision for selecting sensors prior to posting a request for sensor data.

Control panel 204 further allows users to refine the search. Notice, for example, that there may be a high density of sensors in certain key areas of the region, such as at freeway interchanges. A user may want to know the traffic status at a particular stretch of freeway within the region depicted in results pane 202. Control panel 204 can be used to navigate through the location to find the stretch of road, limit display of only traffic sensors 226, and then ascertain the traffic sensor density (i.e. number of traffic sensors present in the particular location). A facility may be provided to identify locations of the traffic sensors 226 (i.e. latitude and longitude of locations of traffic sensors) within the target freeway or a list may be provided to allow the user to choose specific sensors along this stretch of road. Upon identifying target sensors, a new query may be submitted and processed to collect data only from the specified traffic sensors 226.

In one implementation, UI 116 enables the user to specify freshness constraints of the sensor data in terms of how stale (or how recent) the sensor data is to be acceptable. For example, the user may specify that that sensor data older than a particular time period (e.g., 10 minutes, 1 hour, 1 day, etc.) may not be acceptable. Thus, the user can obtain the latest sensor readings from all the locations.

Exemplary Server Implementation

Figure 3:
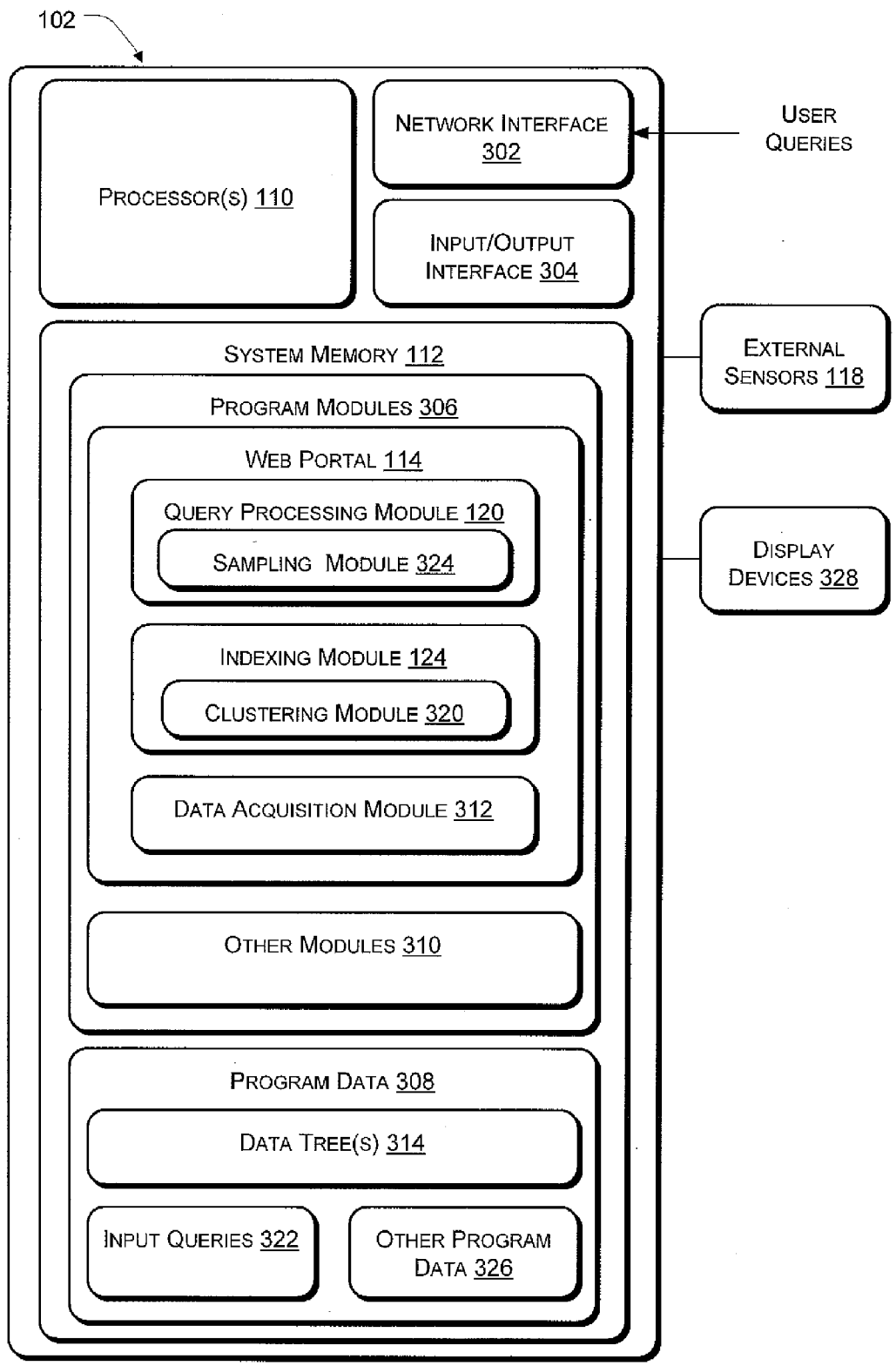
FIG. 3 is a block diagram of the server in FIG. 1, which is configured to process a query for sensor data and collect sensor data from one or more sensors defined in the query.

FIG. 3 shows certain functional aspects of server system 102 in more detail. As noted earlier, server system 102 includes processor(s) 110 and system memory 112. Server system 102 further includes network interfaces 302 to provide connectivity to a wide variety of networks, such as network 106, and protocol types such as wire networks (e.g., LAN, cable, etc.) and wireless networks (e.g., WLAN, cellular, satellite, etc.). Input/output interfaces 304 provide data input and output capabilities for server system 102. Input/output interfaces 304 may include, for example, a mouse port, a keyboard port, etc.

System memory 112 stores program modules 306 and program data 308. Program modules 306 include, for example, a web portal 114 and other application program modules 310 (e.g., an Operating System (OS) to provide a runtime environment, networked communications between multiple users, and so forth).

Web portal 114 has several responsibilities including acting as a front end or proxy to the sensor networks, performing the data collection by communicating with the sensor networks, and initiating query processing by the backend database by performing query translation. Web portal 114 also presents query results back to the client interface, such as through UI 116. The presentation of results typically includes aggregating sensor readings, since the user is usually not interested in visualizing the results of every single sensor node, especially in regions with a high sensor density. In one implementation described below in more detail, the choice of sensors over which to aggregate is decided dynamically using a pixel-based clustering algorithm that groups sensors lying within a distance corresponding to an n×n block of pixels (where n is a system parameter, but is typically small such as 5×5).

As noted earlier, system 102 may be employed for identifying, capturing, and indexing the metadata associated with external sensors 118 of various sensor networks as well as for subsequently providing and presenting desired sensor data specified by a user via a UI 116. As such, web portal 114 includes a query processing module 120 to handle user queries, an indexing module 124 to index the metadata into a structure, and a data acquisition module 312 to acquire data from the sensors. In the following discussion, components of the server system 102 used to identify and index the sensor metadata are described first, followed by an explanation of components involved in presenting desired sensor data specified by a user.

Server system 102 collects and stores metadata received from external sensors 118 of various sensor networks. The metadata may be provided and registered by sensor network administrators. The metadata may include, for example, locations of external sensors 118 and schemas that define how sensor readings are formatted and how to retrieve that information. From the metadata, indexing module 124 creates an index structure, such as data tree(s) 314, and stores that data trees) 314 as program data 308 in system memory 112.

In one implementation, indexing module 124 is configured to cluster nodes in data tree(s) 314 into groups of nodes such that the tree has a hierarchical structure with one or more layers. More specifically, indexing module 124 includes a clustering module 316 configured to cluster the metadata of sensors 118 into various groups of metadata based on various factors, such as sensor location and sensor type. Subsequent to creating the groups, clustering module 316 constructs layers of the groups of nodes to form data tree(s) 314. Each layer includes multiple nodes, and individual nodes store metadata of corresponding external sensors 118. This process may be performed on a layer by layer basis, where each layer is created successively beginning with the lowest layer. Within the hierarchical arrangement, the nodes may be said to include parent nodes associated with external sensors 118 and child nodes associated with locations of external sensors 118.

Further, each node of data tree(s) 314 is provided with associated caches to store sensor readings collected from the respective external sensors 118. As an alternative, indexing module 124 may allocate a single cache for a layer of nodes in data tree(s) 314.

Figure 4:
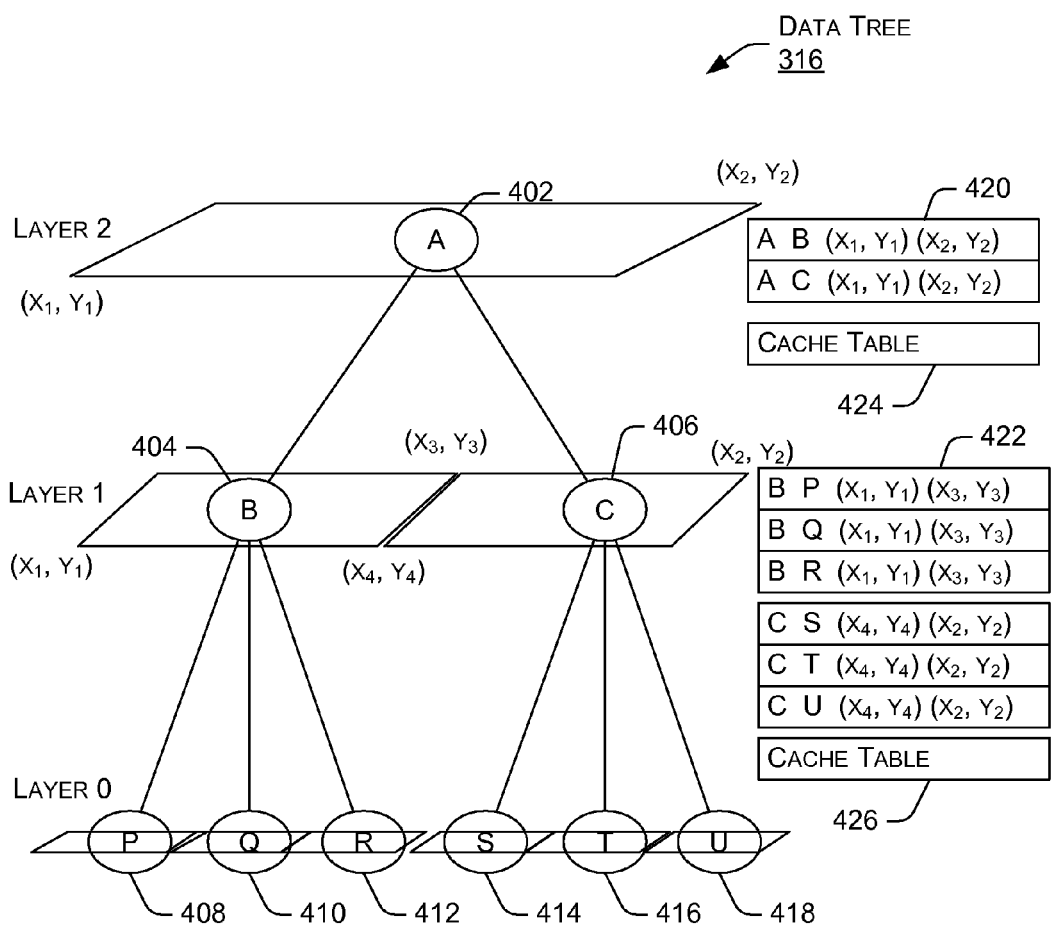
FIG. 4 illustrates one example of a data tree structure having nodes associated with sensors.

FIG. 4 shows one example structure of data tree(s) 314 in more detail. Data tree(s) 314 has multiple layers of nodes 402-418. Each node is associated with at least one external sensor 118. As shown, data tree(s) 314 has a top layer with a parent node 402 corresponding to a main sensor in a sensor network. Parent node 402 is illustrated with two child nodes 404 and 406 that form a middle layer. These middle-layer child nodes 404 and 406 may each have one or more children, as represented by two sets of three child nodes in which nodes 408, 410, and 412 are children of node 404 and nodes 414, 416 and 418 are children of node 406. These last nodes 408-418 form leaf nodes of the data tree(s) 314 in that there are no further child nodes dependent from them. The leaf nodes 408-418 form a bottom layer of the tree.

Each node in each layer of data tree(s) structure 314 has an associated cache to store sensor readings obtained from external sensors 118. During a process of collecting sensor readings, sensor readings from a plurality of external sensors 118 are stored in the caches associated with leaf nodes 408-418. Further, nodes 404 and 406 of the middle layer may store a processed version of the sensor readings of respective child nodes. For instance, node 404 stores a processed version of the sensor readings stored in child nodes 408, 410, and 412. The processed version may be an average of the sensor readings. Further, root node 402 at the upper layer may store data obtained by processing the sensor readings stored in child nodes 404 and 406 in the middle layer, such as averaging the sensor readings in nodes 404 and 406.

In one implementation, the data tree(s) structure 314 is configured as a Collection R-Tree (or "COLR-Tree"), which provides a spatial index of sensors in the sensor networks. Each layer 0, 1, 2 in the data tree(s) 314 has an associated table, as represented by table 420 for layer 2 and table 422 for layer 1. The layer tables 420 and 422 have columns representing an identifier for a parent node, an identifier for a child node, and any metadata corresponding to that child node. Here, the metadata is spatial metadata indicating a bounding box in terms of (x, y) coordinates of the child node and the number of sensors below the child node. Notice that the bounding box of the root node 402 is roughly the combined size of the boxes for the leaf nodes 408-418 descendant from the root node 402. The bounding boxes represent geographical regions within which sensors associated with the nodes are positioned. Thus, the root node 402 contains sensor data that is an aggregate (e.g., average) of data obtained from multiple sensors in lower layers.

There is one row in the layer tables for each child node. Layer tables 420 and 422 are associated with each other in that child identifiers in an upper level layer table are present as node identifiers in a lower level layer table. The data tree(s) 314 is traversed by obtaining following successive child identifiers through the layer tables 420 and 422. Each layer table has a corresponding cache table, as represented by cache tables 424 and 426. Each cache table stores cached sensor readings of nodes within the layer. Cache tables 424 and 426 contain a node ID, a value representing the (possibly aggregated) reading, a slot ID, and the number of descendant leaves in the subtree.

The data tree(s) 314 (COLR-tree structure) may be constructed by indexing module 124 in a bottom-up fashion from the lower layer of nodes to the upper layer. In one approach, indexing module 124 clusters sensor metadata using a k-means clustering technique (i.e., an algorithm to cluster objects based on attributes into k partitions or clusters) based on the geographic proximity of the sensors. This process is repeated to construct the data tree(s) 314 one layer at a time, terminating at the construction of a single cluster which becomes the root of our index.

In another implementation, clustering module 316 constructs multiple data tree(s) 314 simultaneously. Further, one or two sets of data tree(s) 314 may be linked to each by clustering module 316, assuming a relation between the sets of data tree(s) 314 may be identified.

After data tree(s) 314 has been constructed and stored, system 102 is ready to accept queries and process those queries to return sensor data requested by the users. User input queries are received from client devices 104 over the network via network interfaces 302, or obtained from input/output interfaces 304, and are passed on to query processing module 120 for processing. Input queries 318 are shown stored as program data 308 in FIG. 3 and accessible during processing. Query processing module 120 examines input queries 318 to identify a target data tree that has a set of external sensors 118 that are likely to satisfy information specified in input queries 318 by the users. The information may include, for example, location of sensors 118, spatial properties of external sensors 118 (i.e. spatial skewed distribution of sensors in each sensor networks or angle of location of the sensors), number of sensor readings, and so forth.

Once a target data tree is identified, query processing module 120 identifies a set of external sensors 118 represented by nodes within the data tree(s) 314. In one implementation, query processing module 120 employs a sampling module 320 to conduct a layered sampling process that leverages the index structure of the target data tree to produce a random subset of sensors with a similar spatial distribution to the original set of sensors. As a result, the sampling process reduces the number of external sensors 118 to be probed for sensor readings, and yet still provide an accurate response to user queries (i.e. input queries 318). Thus, the sampling process reduces the communication cost and end-to-end latency in providing the sensor data from the time of receipt of input queries 318 by system 102.

Generally, layered sampling allows siblings in the data tree(s) 314 to independently choose samples from their descendants. A user specifies a sample target size (i.e., the number of sensors to be read). Starting at the root node, with the user-specified sample target size, the sampling module 320 first examines the cache tables at each layer to determine whether current data exists. Depending upon the data in the cache, the sampling module 320 decides how many additional samples are needed. Thereafter, the sampling module 320 traverses through the target data tree, descending along nodes relevant to the query and splitting the target size amongst the child nodes. Thus, each child node is asked to return a sample smaller than the original target size, so that consequently when the samples from each child node are combined, the original size goal is met. The sampling traversal terminates when a node is assigned a target size smaller than a value of one.

More particularly, in the present implementation, sampling module 320 may assign a target size at a node as 'r' and define a target size at one of its child nodes as '$r_i$'. The target size of the child nodes may be computed as:

$$r_i = r \times \frac{w_i}{\sum_i w_i} \qquad (1)$$

where '$w_i$' is a number of sensors that are descendents of child node 'i' of the current node (parent node or root node of the data tree). Thus, the above equation (1) denotes that the sample target size is divided and allocated to each sensor present at the branches of the current node. Such allocation process results in the identification of a smaller sample of nodes associated with lesser number of sensors than a desired number of external sensors 118. This smaller sample of nodes is sent to data acquisition module 312 for probing the sensors to collect the sensor readings. The sensor readings collected are stored into caches of respective nodes and displayed to the user on UI 116 through display devices 324.

For example, sampling module 320 may need to identify a set of prominent temperature sensors from a location having high density temperature sensors (i.e. higher number of temperature sensors). Sampling module 320 may review the target data tree and distribute the target size specified by the user amongst the nodes on a layer by layer fashion. Implementation of such a process results in the elimination of nodes having target sizes less than one. Thus, the sensor data may be collected from a set of sensors having fewer sensors, thereby reducing a time delay in collection and presentation to the user. In such a scenario, a user may prefer to obtain the sensor data at a shorter time interval.

In one exemplary implementation, sampling module 320 may be configured to eliminate some child nodes that may not possess any sensor readings that can contribute to the sensor data. In such a case, sampling module 320 may allocate a larger fraction of the sample target size to each child node. Thus, the larger fraction of the target size assigned to the child nodes can be computed as:

$$r_i = r \times \frac{w_i}{\sum_i w_i \times [|\text{overlap}(BB(i), q)|]} \qquad (2)$$

where '$w_i$' is a number of sensors that are descendents of child node 'i' of the current node, 'overlap' denotes an indicator function that represents a maximum number of nodes in the target data tree that may satisfy the query rather than the total number of sensors descending the current node.

For example, sampling module 320 may split the target size of temperature sensors (i.e. for a specified temperature data in a location) unequally amongst the child nodes by assigning a larger target size and a smaller target size to higher weighted nodes and lower weighted nodes, respectively. Such a process may be implemented to further reduce the number of sample sensors by eliminating the sensors that may not overlap with the user's query (i.e. may not contribute to the user's query) thereby reducing the end-to-end latency. Thus, a smaller sample of nodes determined by the above reduction process is send to data acquisition module 312 for probing the sensors to collect the sensor readings. The sensor readings collected are stored into caches of respective nodes and displayed to the user through UI 116 on client devices 104 or on other display devices 324.

In yet another implementation, child nodes possessing sensor readings in the cache, stored during any of the previous traversals through the target data tree by sampling module 320, may be eliminated to reduce the number of sample sensors. In such a scenario, sampling module 320 may deduct the child nodes having the sensor readings in the cache. Thus the target size of the child nodes 'i' can be computed as:

$$r_i = r \times \frac{w_i - c_i}{\sum_i w_i \times [|\text{overlap}(BB(i), q)|]} \qquad (3)$$

where '$w_i$' is a number of sensors that are descendents of child node 'i' of the current node, 'overlap' denotes an indicator function that represents a maximum number of nodes in the target data tree that may satisfy the query rather than the total number of sensors descending the current node and '$c_i$' denoting the sampling weight. The sampling weight corresponds to an aggregate of the values of number of sensors having the sensor readings pre-stored in the cache.

For example, upon traversing through the target data tree to identify a set of temperature sensors, sampling module 320 may determine the nodes having the latest temperature readings stored in the cache. In such a case, nodes associated with the set of temperature sensors may be deducted from the number of nodes that are descendants of a child node of the any of parent nodes associated with the set of temperature sensors. Thus, a smaller sample of nodes determined by the above reduction process is send to data acquisition module 312 for probing the sensors to collect the sensor readings. The sensor readings collected are stored into caches of respective nodes and displayed to the user on UI 116 through display devices 324.

In one exemplary implementation, sampling module 320 may determine the smaller sample of nodes by performing all the techniques simultaneously, as described above according to equation (1), (2) and (3) thereby reducing the end-to-end latency. Further, it may be noted that sampling module 320 can determine the smaller sample of nodes employing the techniques as described in equation (1), (2) and (3) in various combinations.

Operation

Figure 5:
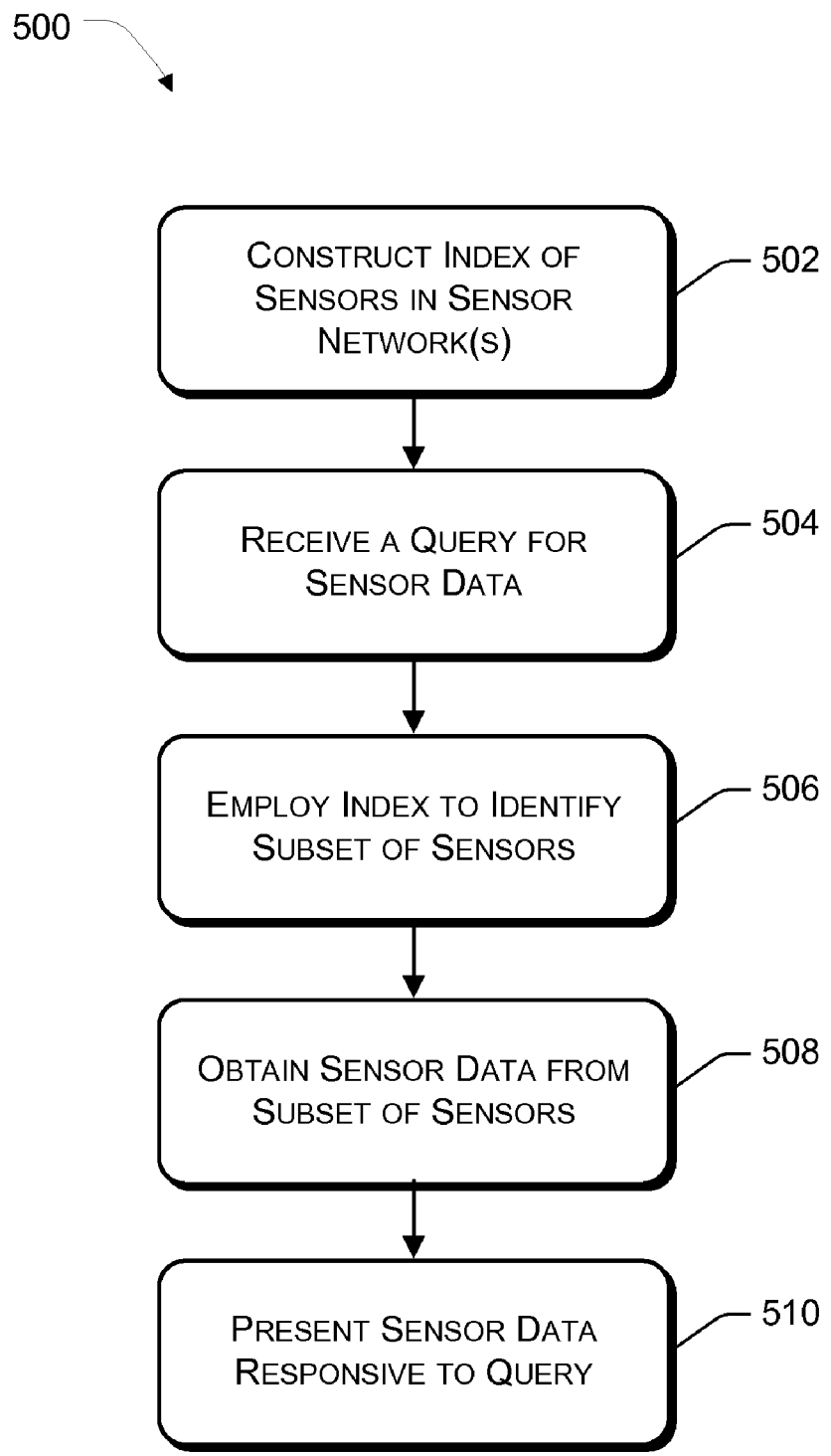
FIG. 5 is a flow diagram of a process for performing communication efficient spatial searches for sensor data based on a user's query.

Exemplary processes for operating a sensor data web portal to conduct communication efficient spatial searches for sensor data are described in this section with additional reference to FIGS. 1-4. FIG. 5 provides an overview of performing communication efficient spatial searches, while FIGS. 6 and 7 offer more detailed implementations of creating an index of sensors and processing queries using the index. The exemplary processes may be described in the general context of computer executable instructions. Generally, computer executable instructions can include routines, programs, objects, components, data structures, procedures, modules, functions, and the like that perform particular functions or implement particular abstract data types. The processes may also be practiced in a distributed computing environment where functions are performed by remote processing devices that are linked through a communications network. In a distributed computing environment, computer executable instructions may be located in both local and remote computer storage media, including memory storage devices.

FIG. 5 illustrates a general overall process 500 for performing communication efficient spatial searches for sensor data based on a user's query. The process 500 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. The order in which the process is described is not intended to be construed as a limitation, and any number of the described blocks can be combined in any order to implement the process, or an alternate process. Additionally, individual blocks may be deleted from the process without departing from the spirit and scope of the subject matter described herein. For discussion purposes, the process 500 is described with reference to environment shown in FIG. 1 and system 102 shown in FIG. 2.

At 502, an index of geographically-distributed sensors is constructed and stored. In one context, the sensors capture data pertaining to weather, traffic, parking, security, real-time views, and so forth. In building this index, a sensor registration process may be conducted, where sensor network administrators provide metadata including sensor locations and schemas of sensor readings. The metadata may include, for example, sensor location, type of sensor, schema for sensor readings, and so forth.

In one approach, index construction is initiated with the hierarchical clustering algorithm described above, which constructs one layer of the index at a time from the metadata. According to one implementation, the index is formed as a data tree with multiple layers of nodes, where individual nodes are associated with caches to store metadata of external sensors 118. One example data tree(s) 314 is shown in FIG. 4. The administrator may modify the index by eliminating certain sensors which may not be deemed useful, or alternatively may specify a selected number of sensors for any particular location.

At 504, a query for sensor data is received. The query may be submitted by users via UI 116 on client devices 104 and routed to server 102 via network 106. Query processing module 120 may review the query to identify certain information, such as location of sensors, number of sensors (i.e. external sensors), and so forth. The query may further include the identity of certain external sensors 118 or indicate a physical boundary of a particular area in which the sensors exist. For example, if the user is interested in a location with a high density of traffic sensors, the user may input a geographical range within which traffic sensors may be sampled.

At 506, a subset of the sensors from which to obtain data that would satisfy the query is identified using the index. In one implementation, the smallest possible number of nodes is determined. The number of sensors in the subset may be specified in the user query, or chosen by the system administrator as a controllable parameter. The sensors forming the subset are then selected randomly from the index to exhibit a spatial distribution similar to the complete set of sensors.

At 508, sensor data is obtained from the subset of sensors. The sensor data may be retrieved from caches associated with the sensors, or alternatively data acquisition module 312 may poll the subset of sensors and collect updated sensor readings on demand.

At 510, the sensor data is formatted and presented to the user in a manner responsive to the user query. The sample sensor data may be displayed through UI 116, as shown in FIG. 2.

Figure 6:
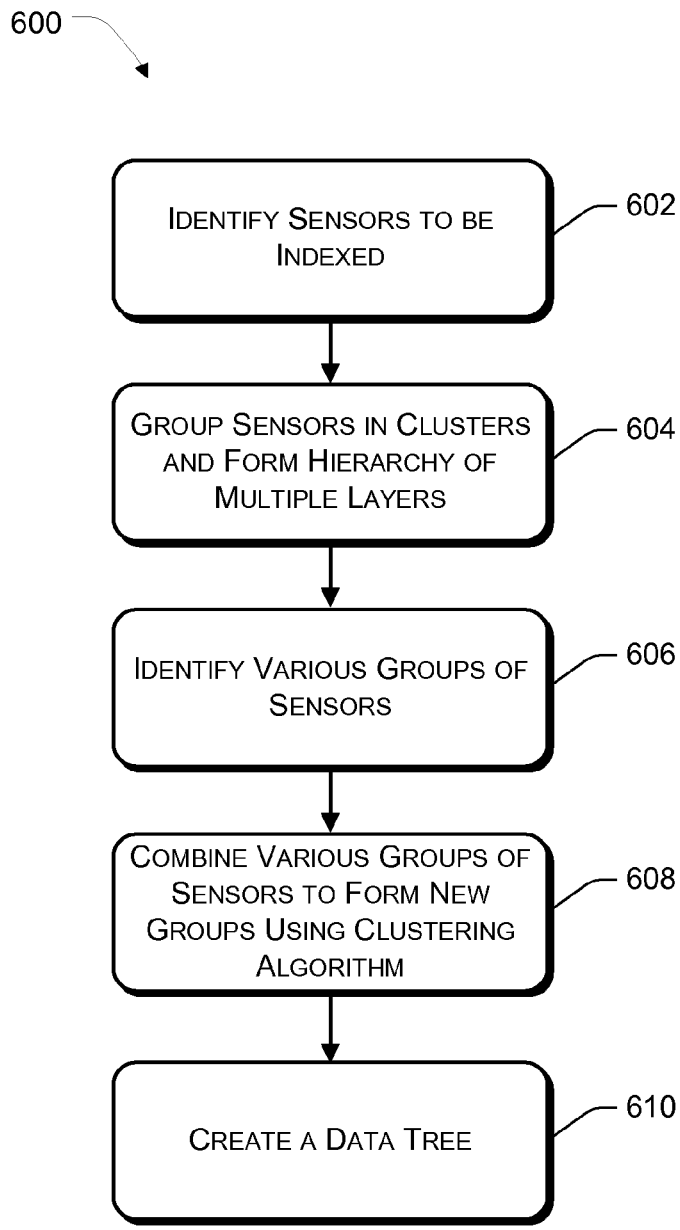
FIG. 6 is a flow diagram of a process for creating a data tree, such as that shown in FIG. 4.

FIG. 6 illustrates an exemplary process 600 for creating a data tree in more detail. At 602, sensors to be included in an index are identified. This may be accomplished through a registration process, for example, where sensor network administrators register sensors with the web portal. The administrators may submit metadata on the sensors including sensor type, location, schemas, and so on.

At 604, sensors to be represented in the index are clustered together to form groups. In one implementation, clustering module 316 runs a clustering algorithm to form the groups of sensors. The clustering may be based on one or more criteria, such as sensor type, location, and so forth. As shown in FIG. 4, for example, clustering module 316 creates a bottom layer (i.e., layer 0) of all possible sensors to be represented by the index. The clustering process may then be repeated to form successively higher layers up to top layer with a single root node.

At 606, various groups of sensors that may be interlinked in some manner are identified. As one example, external sensors 118 located in smaller areas within a particular location may be aggregated to form a group.

At 608, the various groups of sensors can be combined to form new larger groups of sensors. In one technique, a clustering algorithm employs a pixel-based clustering algorithm that enables grouping of sensors lying within a distance corresponding to an n×n block of pixels, where n denotes a system parameter (e.g., 5×5). Various groups of external sensors 118 are reviewed by clustering module 316 using the pixel-based clustering algorithm to determine whether distances between groups of external sensors 118 tallies with a distance of an n×n block of pixels. If found that the distances tallies, the groups of external sensors 118 can be associated with one another to form new groups of external sensors 118.

At 610, one or more data trees are formed from the groups of sensors including newly combined groups. The data trees are created by clustering module 316 and stored in database.

Figure 7A:
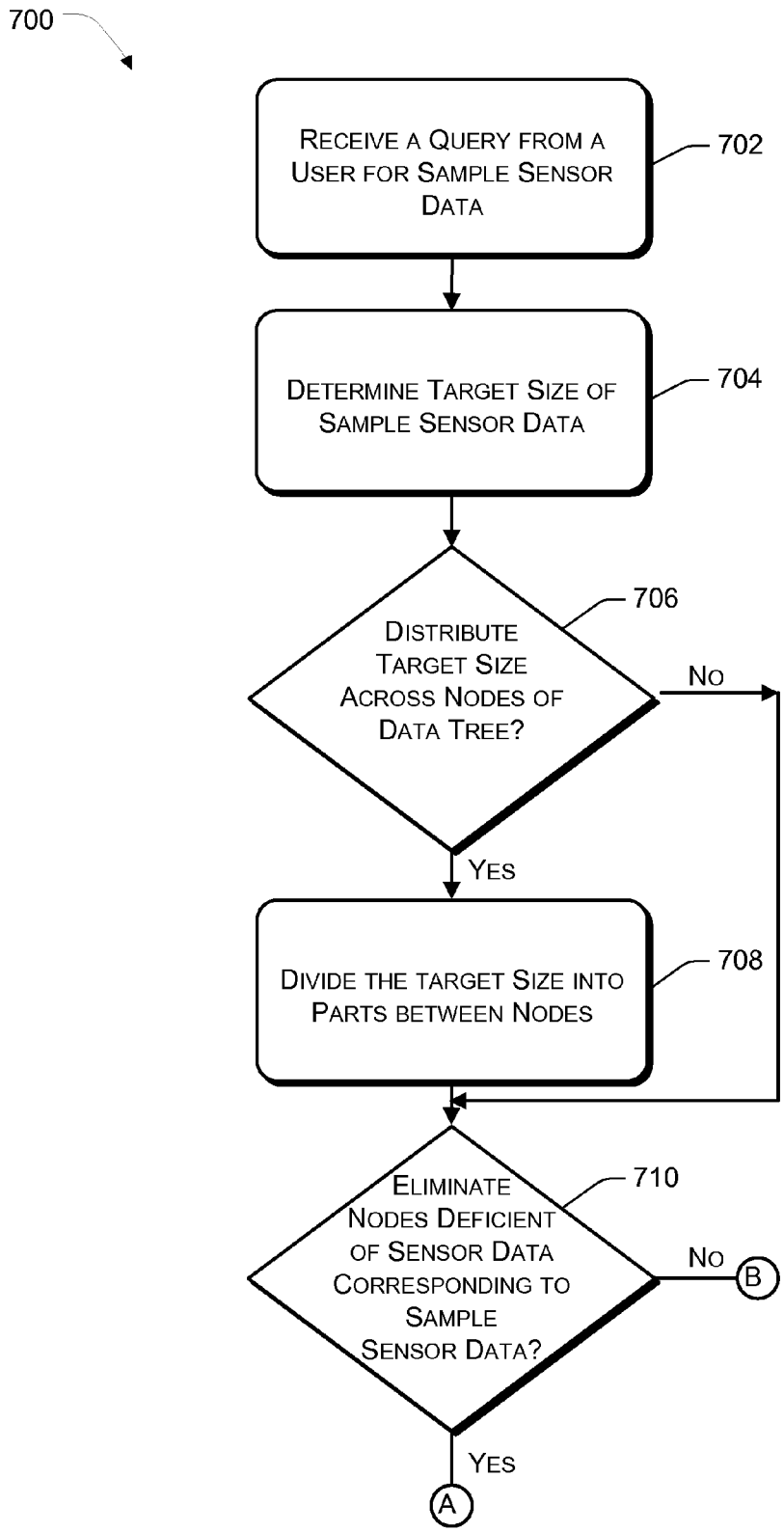
FIGS. 7A and 7B present a flow diagram of an exemplary process for processing a query for sample sensor data and identifying a subset of nodes corresponding to sample sensor data.
Figure 7B:
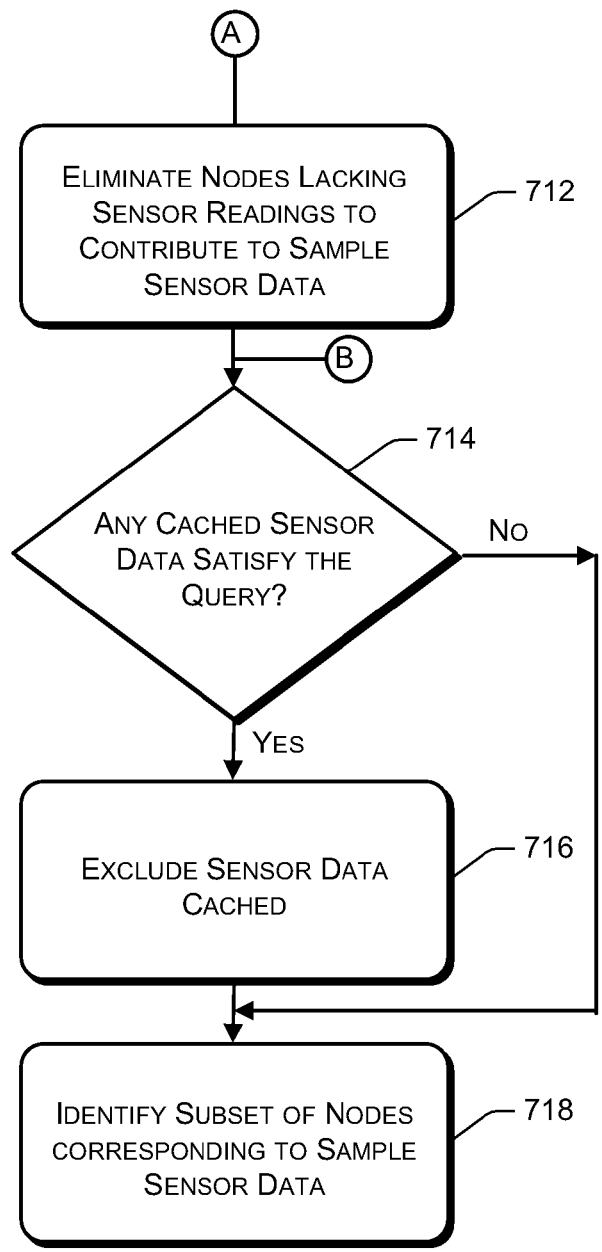

FIGS. 7A and 7B illustrate an exemplary process 700 for processing a query for sample sensor data. At 702, a query for sample sensor data is received from a user. The query may be received by query processing module 120, which identifies a set of constraints specified by the user. The constraints may include a number of external sensors 118 that to be probed to obtain sensor readings corresponding to the sample sensor data.

At 704, a target size of how many external sensors should be probed to retrieve the desired sensor data is determined. The target size may be specified in the input query, or it may be a parameter specified by the system administrator. It may also be inferred or calculated based on information provided in the query.

At 706, a determination is made whether the target size needs to be distributed among a group of multiple nodes of the data tree. If so (i.e., the "yes" path from block 706), the target size if divided into parts and nodes from a top to bottom layer are assigned a smaller target size at 708.

If the query does not include any information regarding dividing target size (i.e., the "no" path from block 706), a determination is made whether nodes deficient of sensor data corresponding to the requested sensor data should be eliminated. The query processing module may review the query to identify whether the user has specified to eliminate such nodes. If specified (i.e., the "yes" path from block 710), such nodes are eliminated from the group of nodes of the data tree at 712.

If the query does not specify the elimination such nodes (i.e., the "no" path from block 710), a determination is made whether any cached sensor data would satisfy the query at 714. If such cached data exists (i.e., the "yes" path from block 714), such nodes can be excluded from the group of nodes in the data tree which will be probed at 716. Conversely, if the query does not specify elimination of such nodes (i.e., the "no" path from block 714), the subset of nodes from which to provide the sensor data are identified and the corresponding sensors are probed at 718. The data may then be returned to the user, such as via UI 116.

Conclusion

Although embodiments of techniques of identifying and displaying a sample sensor data based on a user's query have been described in language specific to structural features and/or methods, it is to be understood that the subject of the appended claims is not necessarily limited to the specific features or methods described. Rather, the specific features and methods are disclosed as exemplary implementations techniques of identifying and displaying a sample sensor data based on a user's query.

What is claimed is:

1. A method comprising:
constructing an index of sensors;
clustering sensors together to form groups of sensors in a hierarchal structure, wherein the formation of the groups of sensors is based on at least one or more criteria including: sensor type, sensor location, and sensor schema;
responsive to a query requesting sensor data, identifying via the index a random subset of sensors, from the groups of sensors, from which to collect the sensor data, wherein the random subset of sensors exhibits a spatial distribution similar to that of a full set of the sensors, wherein the identifying comprises:
ascertaining a target size of a number of sensors to be read;
splitting the target size into smaller portions; and
distributing the smaller portions across the index of sensors; and
obtaining the sensor data from the subset of sensors, wherein the sensor data includes sensor readings and metadata, the metadata comprising a schema that defines how the sensor readings are formatted.

2. A method as recited in claim 1, wherein the constructing comprises creating a data tree, wherein the structure of the data tree includes a plurality of nodes arranged in a hierarchy of layers, the nodes including leaf nodes that cache sensor data captured from associated sensors and interior nodes that aggregate the sensor data of the leaf nodes dependent therefrom.

3. A method as recited in claim 2, wherein the data tree is configured as a Collection R-tree being a spatial index based on a R-Tree structure.

4. A method as recited in claim 2, wherein the aggregation by the interior nodes comprises dynamically selecting leaf nodes to aggregate using a pixel-based clustering algorithm that groups sensors corresponding with an "n"×"n" block of pixels, wherein "n" is a system parameter.

5. A method as recited in claim 1, wherein the target size is defined by a user.

6. A method as recited in claim 1, wherein the distributing comprises excluding any sensors that would fail to contribute to the sensor data requested in the query and allocating larger portions of the target size to other parts of the index.

7. A method as recited in claim 1, further comprising presenting the sensor data in a user interface in response to one or more of: the query, a region selection, a sensor type selection, a sensor density selection, a format selection, a sensor data newness designation, and a saved view selection.

8. A computer architecture of one or more computing devices, where the one or more computing devices has memory and one or more processors operatively coupled to the memory, the computer architecture comprising:
a web portal hosted on at least one computing device, the web portal collecting sensor readings and metadata of sensors, wherein the web portal also indexes the metadata into an index structure, the metadata comprising a schema that defines how the sensor readings are formatted, wherein the web portal clusters sensors together to form groups of sensors in a hierarchal structure, wherein the groups of sensors are formed based on at least one or more criteria including: sensor type, sensor location, and sensor schema;
a database to store the index structure and to cache sensor data obtained from the sensors; and
the web portal being configured to receive a query for specified sensor data and to identify, using the index structure, a random subset of sensors, from the groups of sensors, from which to collect the sensor data, wherein the random subset of sensors exhibits a spatial distribution similar to that of a full set of the sensors.

9. A computer architecture as recited in claim 8, wherein the index structure comprises a tree structure with a plurality of nodes arranged in plural layers, the nodes including leaf nodes that cache sensor data captured from associated sensors and interior nodes that aggregate the sensor data of the leaf nodes dependent therefrom.

10. A computer architecture as recited in claim 9, wherein the index structure further comprises:
tables associated with the layers in the tree structure, the tables providing associations between nodes in different layers; and
one or more data caches to store the sensor data.

11. A computer architecture as recited in claim 8, wherein the web portal comprises:
an indexing module to create the index structure as a tree structure with a plurality of nodes arranged in plural layers in a hierarchical manner, the nodes including leaf nodes that cache sensor data captured from associated sensors and interior nodes that aggregate the sensor data of the leaf nodes dependent therefrom;
a query processing module to determine, based on the query, the subset of sensors from which to capture sensor data being requested in the query; and
a data acquisition module to collect the sensor data from the subset of sensors.

12. One or more computer-readable media comprising computer executable instructions that, when executed on one or more processors, perform acts comprising:
generating an index structure comprising a plurality of nodes that are associated with one or more sensors in at least one sensor network, the nodes including leaf nodes that cache sensor data captured from associated sensors and interior nodes that aggregate the sensor data of the leaf nodes dependent therefrom;
receiving a query for sensor data;
using the index structure to identify a random subset of sensors from which to collect the sensor data in response to the query, wherein the random subset of sensors exhibits a spatial distribution similar to that of a full set of the sensors, wherein identify a random subset of sensors comprises:
ascertaining a target size of a number of sensors to be read;
splitting the target size into smaller portions; and
distributing the smaller portions across the index of sensors; and
acquiring the sensor data from the random subset of sensors, wherein the sensor data includes sensor readings and metadata, the metadata comprising a schema that defines how the sensor readings are formatted.

13. One or more computer-readable media of claim 12, wherein the plurality of nodes are arranged in hierarchical layers generated by clustering the nodes from a bottom layer to an upper layer.

14. One or more computer-readable media of claim 12, wherein the index structure further comprises:
  tables associated with the layers in the tree structure, the tables providing associations between nodes in different layers; and
  one or more data caches to store the sensor data.

15. One or more computer-readable media of claim 12, wherein the query includes a target number of sensors from which to capture the sensor data, and the identified subset contains no more than the target number of sensors.

16. One or more computer-readable media of claim 15, wherein the target number of sensors is based on a target size of the sample sensor data defined by a user.

17. One or more computer-readable media of claim 16, further comprising computer executable instructions that, when executed, perform an additional act comprising segregating a target size of the sample sensor data into smaller portions and distributing the smaller portions across the index structure so that groups of sensors in the subset return sensor data that, when combined across the groups, provides sufficient sensor data to satisfy the number of sensors to be read.

18. One or more computer-readable media of claim 17, further comprising computer executable instructions that, when executed, perform additional acts comprising:
  eliminating sensors from the subset of sensors that do not possess readings that contribute to the sensor data;
  examining a cache table corresponding to each node to determine whether current data exists that satisfies the query;
  determining whether additional samples are needed; and
  redistributing portions of the target size to other sensors.

19. One or more computer-readable media of claim 12, wherein the acquiring comprises retrieving the sensor data from one or more caches of the index structure.

20. One or more computer-readable media of claim 12, wherein the acquiring comprises probing the sensors for updated sensor data.

21. A computer system, comprising
  one or more processors; and
  one or more computer-readable media of claim 12, wherein the computer-executable instructions are executed on the one or more processors.

* * * * *